UNITED STATES PATENT OFFICE.

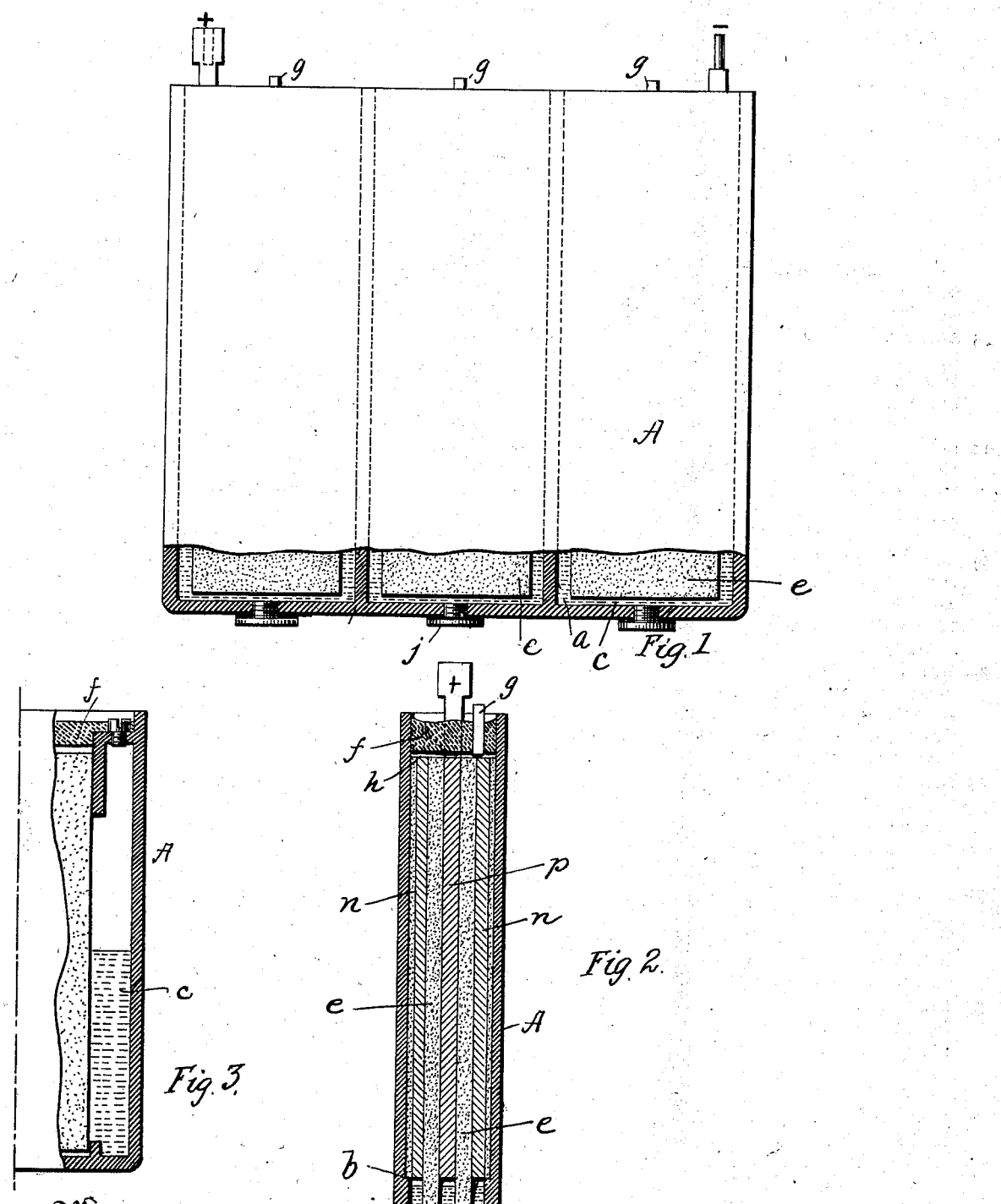

MILLER REESE HUTCHISON, OF UPPER MONTCLAIR, NEW JERSEY, ASSIGNOR, BY MESNE ASSIGNMENTS, TO HUTCHISON ACOUSTIC COMPANY, A CORPORATION OF NEW JERSEY.

ELECTRIC BATTERY.

SPECIFICATION forming part of Letters Patent No. 718,205, dated January 13, 1903.

Application filed April 5, 1902. Serial No. 101,534. (No model.)

*To all whom it may concern:*

Be it known that I, MILLER REESE HUTCHISON, a citizen of the United States, residing at Upper Montclair, in the county of Essex and State of New Jersey, have invented certain new and useful Improvements in Electric Batteries, of which the following is a full, clear, and exact description.

This invention relates to electric batteries, both primary and secondary, and has special reference to what are known as the "dry" or "semidry" class of battery. One of the objections to this class of battery is that such liquid material as is provided in the sealed cell dries out in a comparatively short time and renders the battery useless. Such batteries have therefore been provided with means for renewing or supplying the liquid material either in the form of plain water or acidulated water. My improved cell relates to this latter class, inasmuch as it is provided with means for replenishing the liquid whenever desired. Such a cell is also necessarily provided with a vent-opening to carry off the gases generated while the battery is in action, and it is through this vent that most of the moisture passes out. The vent is usually located in the top of the cell, at which point also it has been customary to provide the opening through which to replenish the liquid material. To render the battery dry or semidry, it is customary to use a suitable porous material, which is filled into the spaces not occupied by the electrodes, a small free space being left above the electrodes and immediately beneath the sealed cover of the cell to receive the liquid poured through the opening in the top. The liquid material is poured in slowly to allow time for it to be absorbed by the porous material, and finally the space at the top is filled and the cell again sealed. Now it has been found in practice that when a battery thus replenished is put into use the generated gases force the free liquid out through the vent-opening in bubbles, and if the battery is used under conditions where this is undesirable—such, for instance, as when it is carried upon the person—this escape or leakage is very objectionable, besides wasting the liquid in the cell. Another disadvantageous feature of replenishing the liquid in the cell in the manner above described is the fact that it interferes with the action of the battery. The gases which are formed at the surfaces of the plates in the cell should be allowed a free and uninterrupted escape through the vent; but when the upper part of the cell is filled with free liquid and the liquid is constantly working downward to fill the dry places in the absorbent material it obstructs the upward movement and escape of the gases, which defect it is of course desirable to cure, and this, together with the other defect above mentioned, is the object of my invention. In my improved cell I provide the free space or reservoir for the liquid in the bottom or side and fill the reservoir through an opening suitably located in the cell. The vent-opening is separated from the reservoir by the porous material in the cell. In this manner the gases traveling toward the vent-opening do not encounter free liquid, and consequently cannot force free liquid out through the vent, nor do the gases encounter liquid flowing or percolating through the absorbent material in a direction contrary to its movement; but instead such liquid moves in either the same direction as the gases or in such a direction as not to retard their progress. It is also desirable to have a liquid-reservoir of considerable capacity in the cell, for the reason that in the charging operation the liquid held by the absorbent is decomposed to release hydrogen, and in discharging there is a tendency also to decrease the degree of saturation, which losses should be at once replaced by liquid from the reservoir to prevent increasing the internal resistance of the cell.

While the above remarks refer more particularly to storage batteries, the invention, as before stated, is applicable also to primary batteries. The moisture in a dry primary cell is generally used up before the cell becomes exhausted chemically, and it is advisable to provide such cells with a reservoir which will supply the liquid as needed, but so located that the free liquid cannot get out of the cell. A battery constructed to carry out these ideas is shown in the accompanying drawings, in which—

Figure 1 is a side elevation of a battery containing three cells, with the side of the jar partially broken away. Fig. 2 is a central vertical section thereof, and Fig. 3 shows a modification.

The particular cell illustrated is a form of secondary battery which I use in connection with telephonic apparatus and which is very often carried upon the person of the user. The containing vessel A is of hard rubber and is divided into three compartments by two partitions $a$. Each compartment contains one positive pole and two negative pole-plates $p$ and $n$. These plates are not so high as the depth of the cell, so that when inserted in place against a supporting-shoulder $b$ a clear space $c$ will be left at the bottom of the cell and another space at the top. In the spaces between and around the plates I insert a number of layers of blotting-paper $e$ or other porous material—such as wicking, asbestos, &c. This material projects downward into the space $c$, but at the top is substantially flush with the upper edges of the plates. The top of the cell is hermetically sealed by a layer of pitch $f$, through which passes a venting-tube $g$ to a small space $h$ between the top of the plates and the pitch. The venting device $g$ is preferably a piece of ratan or similar material having capillary passages through it. The spaces $c$ in the bottom of the cells are provided with liquid-tight plugs $j$, through which liquid can be poured into the spaces by turning the cell upside down. When filled, the plugs are replaced and the battery turned right side up. It will thus be seen that the gases do not oppose the absorption of the liquid by the porous material, nor does the percolating liquid oppose the upward movement of the gases to the vent. Hence the porous material will not dry out as long as there is any liquid in the reservoir, and the internal resistance of the cell will not be increased from such cause. Furthermore, it is quite impossible for any free liquid to be forced out through the vent, since it cannot pass through the large body of absorbent material interposed between the liquid-reservoir and the vent. The absorbent material $e$ passes down nearly, if not quite, to the bottom of the cell, so as always to be in the liquid, and thus maintain for itself a uniform degree of saturation. In the form shown in Fig. 3 the reservoir for free liquid is in the side of the cell and is filled from the top through a plugged opening $o$; but the porous material $e$ is so arranged as to separate the vent from the free liquid, and much the same result is obtained as when the reservoir is in the bottom.

Having described my invention, I claim—

1. A battery-cell having a reservoir for free liquid, electrodes located outside the reservoir, and absorbent material in contact with the electrodes, said absorbent material projecting into the reservoir to convey the liquid therein to the electrodes, substantially as described.

2. A battery-cell consisting of a vessel having plates or electrodes alternating with porous material, a free space for liquid in the bottom of said cell into which said porous material projects, means for filling said free space with liquid, a sealed cover at the top of said vessel and a vent in said cover, substantially as described.

3. A "dry-battery" cell having a reservoir in its bottom for liquid, and a plug in the bottom through which said space can be filled.

In witness whereof I subscribe my signature in presence of two witnesses.

MILLER REESE HUTCHISON.

Witnesses:
WALDO M. CHAPIN,
FRANK S. OBER.